United States Patent [19]

Asbra

[11] Patent Number: 4,998,434
[45] Date of Patent: * Mar. 12, 1991

[54] GAS LEAKAGE DETECTOR

[76] Inventor: Andrew F. Asbra, 555 Laurel St., #121, San Mateo, Calif. 94401

[*] Notice: The portion of the term of this patent subsequent to Jan. 23, 2007 has been disclaimed.

[21] Appl. No.: 416,717

[22] Filed: Oct. 3, 1989

Related U.S. Application Data

[63] Continuation-in-part of Ser. No. 321,960, Mar. 10, 1989, Pat. No. 4,895,018.

[51] Int. Cl.$^5$ ............................................. G01M 3/20
[52] U.S. Cl. ................................................. 73/40.50 R
[58] Field of Search ............................ 73/40.5 R, 40.7

[56] References Cited

U.S. PATENT DOCUMENTS 3,444,724  5/1969  Gilpin ........................... 73/40.5 R
4,377,945  3/1983  Di Giovanni et al. ........... 73/40.5 R

FOREIGN PATENT DOCUMENTS 652502   11/1985  Switzerland ................. 74/40.5 R
1127366   9/1968  United Kingdom ........... 73/40.5 R

*Primary Examiner*—Hezron E. Williams
*Assistant Examiner*—Joseph W. Roskos
*Attorney, Agent, or Firm*—Janet K. Castaneda; Harrison & Eakin

[57] ABSTRACT

A gas leakage detector includes a housing, an inlet coupling, internal fluid flow path and an outlet coupling enabling the housing to be installed and coupled permanently in-line with a gas supply line. The housing includes a cutoff valve, a gas pressure indicator coupling valve, a detachable gas pressure indicator, and a charging gas source coupling enabling a one way flow of optional use charging gas to enter the housing downstream of the valve and to pass into and through the gas supply line. Existing line pressure or charging gas pressure is monitored at the indicator to indicate the presence of any leaks downstream of the valve. The indicator may be attached to the coupling valve on the housing or to the external charging gas source.

11 Claims, 3 Drawing Sheets

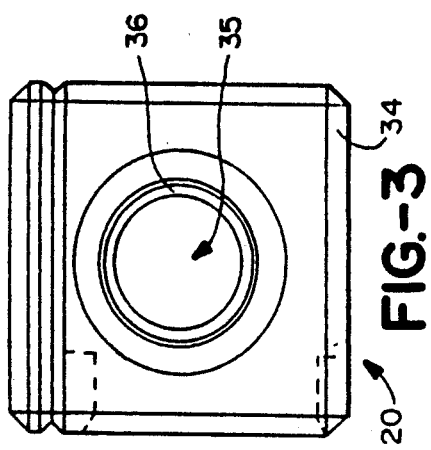
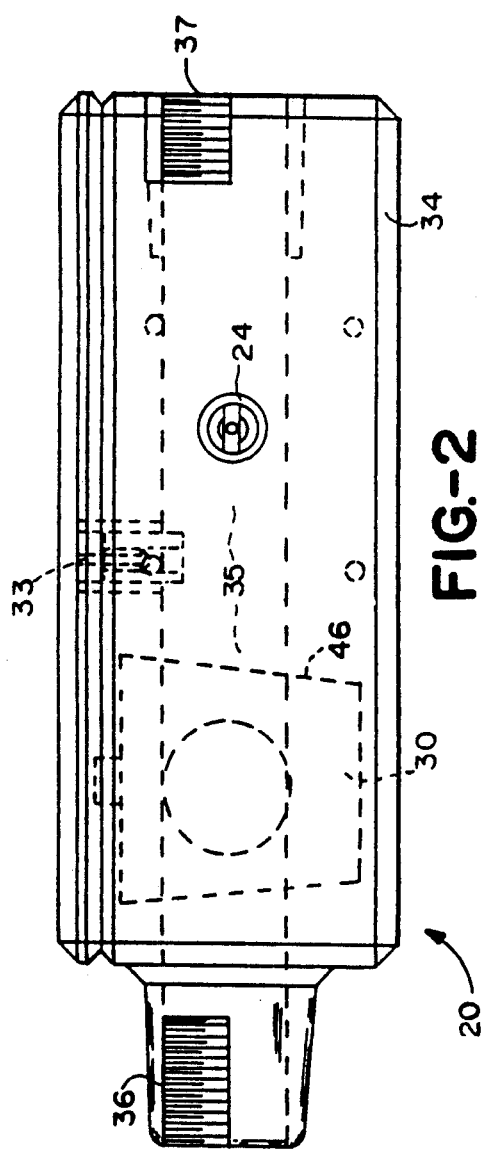
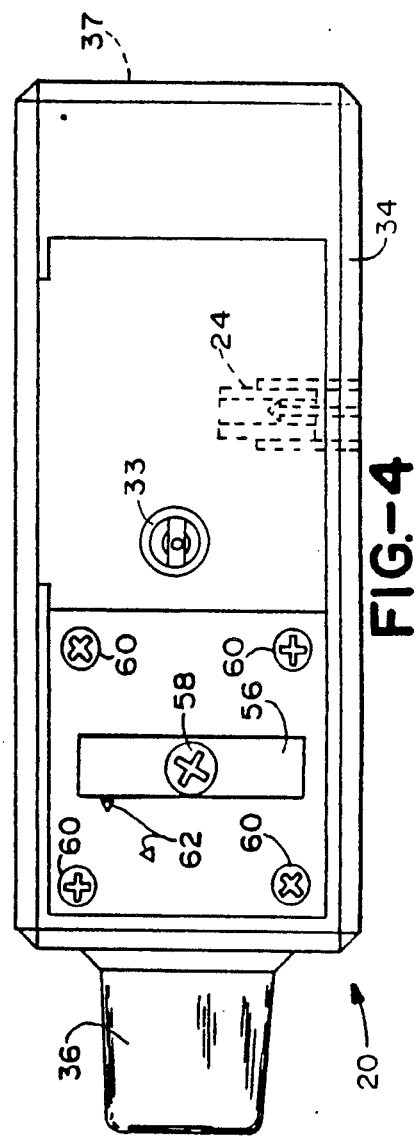

GAS LEAKAGE DETECTOR

RELATED APPLICATIONS

This application is a continuation in part of U.S. Pat. application Ser. No. 321,960, filed Mar. 10, 1989, now U.S. Pat. No. 4,895,018, issued on Jan. 23, 1990.

FIELD OF THE INVENTION

The present invention relates to gas leakage detectors. More particularly, the present invention relates to a permanently installed gas leakage detector for indicating gas leaks after natural or manmade disturbances to gas flow lines.

BACKGROUND OF THE INVENTION

At the instance of a major environmental disturbance, it is, of course, prudent to turn off the supply of heating gas at the main valve feeding the premises in question. However, there are many instances when, due to the magnitude or nature of the disturbance, such as major earthquake, the responsible person is unavailable to close the valve, or is distracted by other more visible problems and emergencies. Thus, automatically actuating gas cutoff valves, such as the type illustrated in U.S. Pat. Nos. 4,116,209 and 4,745,939. While such valves work very well for their intended purpose of automatically cutting off gas flow to the premises protected thereby, once such a valve is actuated by natural or manmade disturbance, it is only natural to check for any gas leaks that may have developed downstream of the valve as a result of the same disturbance In the absence of such an automatic cutoff valve, it is also desirable that a gas leak detection device can be used to cut off gas flow to the premises.

Immediately following earthquakes and other natural disturbances such as storms, floods, subsidences, volcanic eruptions and certain manmade disturbances such as explosions, fires, sonic booms, vibrations, new appliance installations, new or additional construction, the need has arisen to check for gas leaks, gas pipe rupture, and the like, in order to locate and stop leaks, and in order to reassure the occupants that gas is not leaking in their homes, businesses, industries, schools, hospitals and other buildings. For example, for weeks after a sizeable earthquake, the gas company employees are still locating and repairing leaks in gas lines and are only restoring gas delivery service after it has been ascertained that the leaks are repaired or that there are no leaks present. A considerable time delay is thereby incurred in service restoration.

The main line gas supply should not be used to monitor and detect leaks for safety reasons. Following a disturbance causing the main gas supply to be shut off, the flow meter indicators in the main line drop significantly. In order to use the main gas supply to check for leaks, all appliances would have to be shut off, the high pressure main gas supply would be turned on, and a considerable amount of the high pressure gas would have to be introduced into the line until stabilization of the meter indicators occurred. In the presence of a leak, the high pressure gas would escape into the atmosphere and present a danger of an explosion. Apparatus to detect leaks has commonly employed inert materials for safety reasons.

In non-earthquake prone parts of the world there is often urgent need to check for leaks due to ground settling, flood damage and other vibrational and disruptive causes. A variety of devices and methods have been proposed in the prior art for detecting gas leaks. A fairly elaborate electromechanical valving system providing an electrical alarm signal is disclosed in the Evans U.S. Pat. No. 3,624,627.

The MacMurray U.S. Pat. No. 3,756,072 discloses a portable leak test instrument which is adapted to be installed temporarily and used to check for leaks. The device includes a an air tank, pressure regulator two valves, two pressure indicators and flexible hoses connected via fast disconnect fittings to a stub pipe.

The Ross et al. U.S. Pat. No. 2,727,383 describes a method and apparatus for testing and cleaning pipe lines. Bottled inert gas, such as carbon dioxide, is fed through a flexible hose, coupling, cutoff valve, pressure regulator and pressure gauge to a pipeline system to be checked for leaks. The gas is selected so that any leakage of the gas at a leak site will cause atmospheric moisture adjacent thereto to freeze on the pipe, thereby providing a visible indication of the location of the leak.

The Stern U.S. Pat. No. 2,430,034 describes apparatus for locating leaks via a structure which is inserted into a pipe line. External fluid from a source is piped into one or the other side of the line. A pressure gauge provided on each side of the line indicates whether the pressure is diminishing, thereby signalling a leak.

A major disadvantage of the portable gas leakage detectors is the necessity for opening the gas line in order to install the detector. Explosive gases may be released, even with reduced gas pressure in the line.

The U.S. Pat. No. 3,184,958 to Eaton describes apparatus designed to detect leaks in a coaxial pipe line, such as a subterranean steam pipe line which would be subject to corrosion from intrusion of ground water. Gas is added to the outer cylindrical space between the two pipes at a pressure sufficient to prevent ground water intrusion. When gas is required to be added to the outer space, an alarm signals the detection of a leak.

Applicant's co-pending U.S. Pat. application No. 07/321,960, now U.S. Pat. No. 4,895,018, issued on Jan. 23,1990, provides a permanently installed in-line leak detection unit with an internal pressure gauge to enable continuous-in-line monitoring of pressure. The unit includes a cover to protect the pressure gauge and may either use the gas existing in the main line to monitor pressure or may include an external charging gas source to ascertain leaks.

Heretofore, there has been no practical, low cost, safe and permanently emplaced device that uses existing material stock for aiding a building owner or occupier in monitoring gas pressure to determine whether or not there are any gas leaks following a major disturbance of the type historically likely to cause gas leaks and resultant fires or explosions.

SUMMARY OF THE INVENTION WITH OBJECTS

A principal object of the present invention is to provide a low cost, reliable gas leakage detector having a permanently emplaced valve and a detachable pressure gauge which overcomes the limitations and drawbacks of the prior art.

A specific object of the present invention is to provide a gas leakage detector particularly well suited for use with heating gas distribution systems including gas cutoff valves which automatically close in response to disturbances such as earthquakes, etc.

One more object of the present invention is to provide a safe gas leakage detector which is very simple to use and understand and which may be used without training and with commonly available pressure supply charging sources, such as canisters of inert gas and hand operated air pumps.

Another specific object of the present invention is to provide a gas leakage detector well suited for use with heating gas distribution systems that do not include gas cutoff valves.

A further object of the present invention is to provide a gas leakage detector that can be used without external pressure supply charging sources.

An additional object of the present invention is to provide a low cost gas leakage detector from existing brass bar stock.

A gas leakage detector in accordance with the present invention includes a housing having an inlet coupling and an outlet coupling enabling the housing to be permanently coupled in-line in a heating gas supply downstream of a main gas shutoff valve, a valve permanently installed within the housing, a charging air source coupling within the housing to enable a two way flow of charging gas from an external source thereof to flow into the housing and thence into the gas supply line, and a detachable gas pressure indicator which may be attached to a valve within the housing or to the external charging gas source for monitoring gas pressure.

The method of the present invention permanently installed within a heating gas distribution system containing a cutoff valve comprises the steps of:

closing off the gas distribution system from a source of gas at the cutoff valve;

coupling a supply of inert charging gas to the gas distribution system upstream of the cutoff valve via a two-way coupling valve fitting;

coupling the gas pressure valve to the housing;

applying a charging gas via the two way coupling valve fitting within the gas detector housing into the distribution system until a predetermined desired charging gas pressure is reached;

monitoring charging gas pressure within the distribution system with the pressure gauge coupled to the housing in order to determine whether there is any diminishment in pressure, thereby indicating the presence of one or more gas leaks within the distribution system;

locating and repairing each detected leak and thereafter reapplying and monitoring charging gas until there is no diminishment in charging gas pressure;

thereupon opening the cutoff valve to restore flow of heating gas from the source thereof; and removing the gas pressure gauge from the housing.

The gas leakage detector of the present invention is designed to function both in conjunction with gas cutoff valves and independently, and may be used to detect leaks in all gas lines whether within or outside of seismic areas. The above method may be modified in systems that do not employ a cutoff valve by using a valve within the gas leakage detection system to cut off the gas flow. It will also be apparent to those skilled in the art that, as a substitute for an external charging gas supply, the existing gas in pressurized lines can be used to detect the gas leak.

In one aspect of the present invention, the charging gas is provided within a small disposable pressure vessel canister fitted with a flow control valve and with a fitting mating with the charging air source coupling of the housing. The gas pressure gauge may also be coupled to the flow control line of the canister to monitor the gas pressure.

In another aspect of the present invention, the charging gas is provided from an air pump by attaching the hose of the air pump to the charging air source coupling of the housing and operating the pump until the gauge in the housing indicates that the desired charging gas pressure has been reached. In this embodiment, the gas pressure gauge is coupled to the housing.

In a third aspect of the present invention, the existing gas in the pressurized gas line is used to detect gas leaks and the gas pressure gauge is coupled to the housing.

These and other objects, advantages, aspects and features of the present invention will be more fully understood and appreciated by those skilled in the art upon consideration of the following detailed description of a preferred embodiment, presented in conjunction with the accompanying drawings.

BRIEF SUMMARY OF THE DRAWINGS

In the Drawings:

FIG. 2 is a side view in elevation and partial section of an in-line unit portion of the gas leak detector in accordance with the present invention. Several portions of the figure are sectioned to illustrate inside pipe threads.

FIG. 3 is a coupling end view in elevation of the in-line unit illustrated in FIG. 2.

FIG. 4 is a top plan view of the in-line unit illustrated in FIG. 2.

DETAILED DESCRIPTION OF A PREFERRED EMBODIMENT

Figure 1:
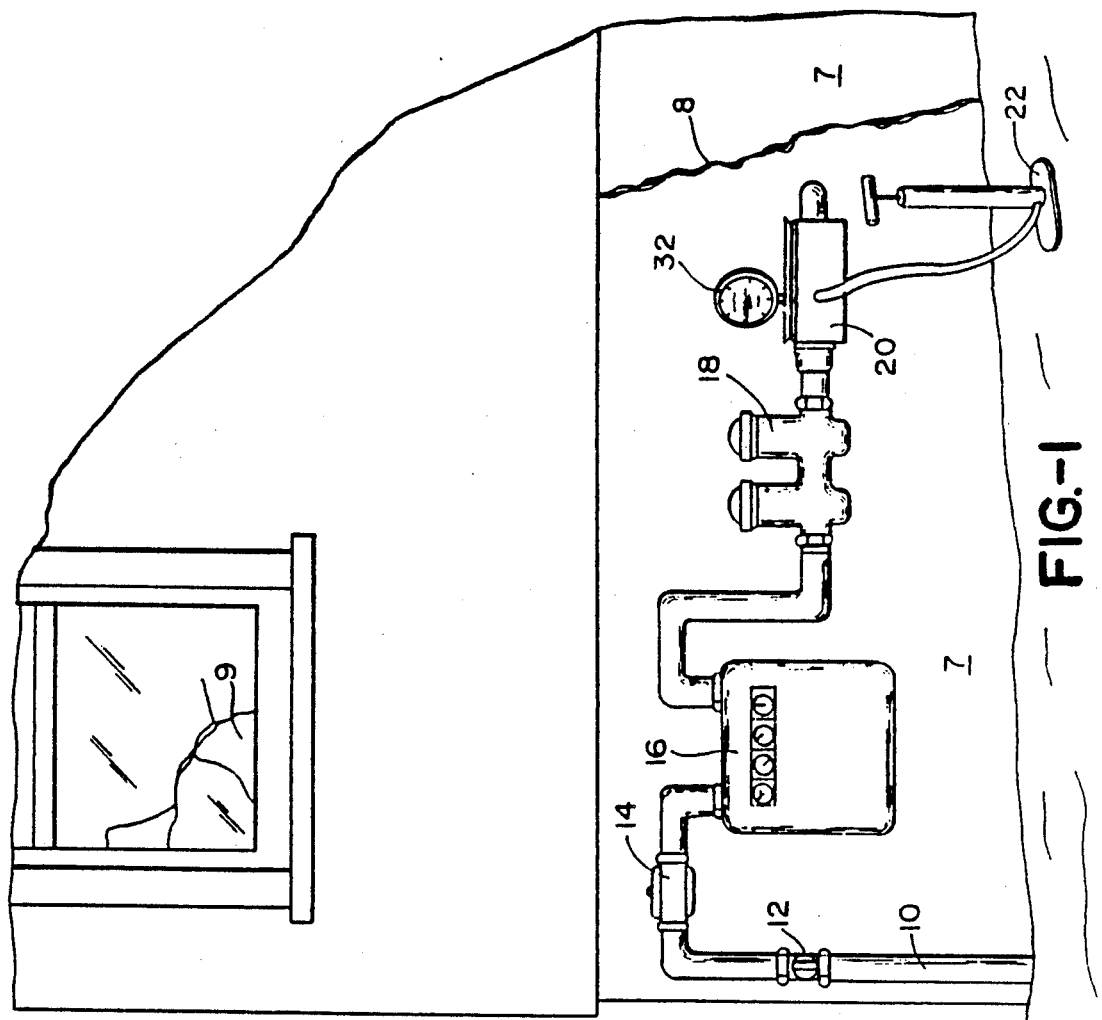
FIG. 1 is a somewhat diagrammatic environmental view of the upstream end of a gas distribution system at a portion of a structure, such as a home, which has been severely damaged e.g. by a major seismic disturbance. A gas leakage detector in accordance with principles of the present invention is shown installed in the illustrated gas distribution system and is being used in order to determine whether gas leaks are present downstream from the detector. A pressure gauge and an optional use air pump and hose are shown attached to the leakage detection system.

A residential structure 6 is shown in FIG. 1 as including a cast-concrete foundation 7 having a significant stress crack 8 and a broken window 9, damage which typically attends major seismic disturbances commonly referred to as earthquakes. Many parts of the world, including particularly the western part of the continental United States and Alaska, are susceptible to earthquakes. Damages from earthquakes depend upon the severity of the quake and the directions of the shock waves relative to the recipient structure.

The home 6 includes a main gas feeder pipe 10 having a main cutoff valve 12, pressure regulator 14, gas meter 16, shock actuated shutoff valve assembly 18 and leak detector in-line unit 20.

When a disturbance such as an earthquake strikes, prudence dictates that the main cutoff valve 12 immediately be closed, to prevent the escape of energy gas into the residence, due to possible rupture of gas pipes and/or leaks at gassupplied appliances, such as stoves, gas dryers, water heaters, furnaces, etc., located within the residence. However, it is not realistic to expect that earthquakes will always occur at times or under circumstances permitting closure of the main cutoff valve 12.

Consequently, it has been found advantageous to provide the shock actuated gas supply cutoff valve assembly 18 which automatically responds to e.g. earthquake shock forces to shut off the gas supply at the gas meter 16 and prevent the continued flow of energy gas into the residence 6. One form of the valve assembly 18 is disclosed in U.S. Pat. No. 4,116,209 and a preferred form, dual shock actuated valve assembly having a gas-tight reset mechanism is disclosed in U.S. Pat. No. 4,745,939, incorporated by reference herein.

After the automatic gas shutoff valve assembly 18 has become actuated because of shock forces, it is imprudent to reset each valve thereof until and unless it is first ascertained that there are no leaks present within the gas distribution lines in the residence downstream from the meter 16. Normally, gas appliances have thermocouple sensors for sensing pilot ignition, and these thermocouples close off the gas supply to the pilot orifice after extinguishment of the pilot flame has caused the associated thermocouple to cool off. Thus, shortly after the valve assembly 18 has cut off the gas supply to the residence 6, all of the gas appliances should be effectively closed off from the gas supply lines, unless the shock forces which have triggered the assembly 18 have also caused internal damage to the appliances or to the gas supply lines downstream from the valve 18.

Consequently, in accordance with the principles of the present invention, a gas leak detector including the in-line unit 20 is connected to the gas supply line downstream of the valve assembly 18 in order to enable the homeowner to test the residential gas distribution lines and appliances for leaks prior to resetting of the valve assembly 18 and reopening of the main supply valve 12. In the absence of valve assembly 18, the in-line unit 20 is connected to the gas supply line downstream from main cutoff valve 14.

The gas leak detector of the present invention has three essential parts: the in-line testing unit 20, a valve for connecting a pressure gauge 32, and a valve for connecting the source of inert charging gas for optional use. One suitable source for charging gas is a hand operated air pump 22, of the type commonly employed to inflate sports balls and bicycle tires, etc. In FIG. 1, such a pump 22 is shown connected to the in-line unit 20 via a conventional threaded inner tube valve stem assembly 24 (FIG. 4).

Figure 6:
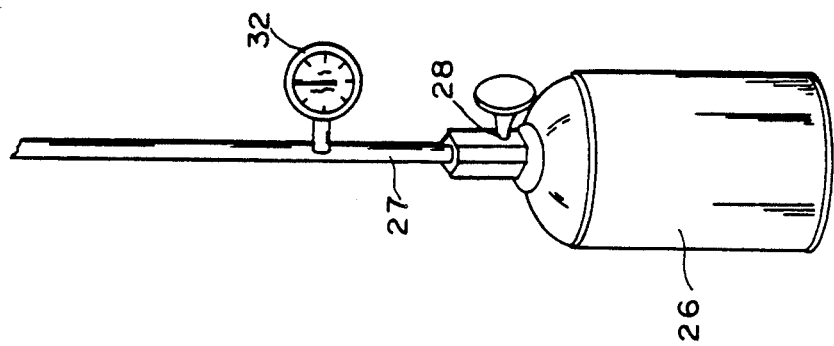
FIG. 6 is a diagrammatic view of an inert charging gas supply canister fitted with a coupling for attachment to a mating charging gas coupling included within the in-line unit illustrated in FIG. 2.

FIG. 6 illustrates a throw-away canister 26 which is precharged to a predetermined pressure with a suitable inert charging gas, such as nitrogen. A removable/reusable needle valve coupling 28 enables a controllable amount of gas to be delivered to the in-line unit 20 from the canister 26 via the fitting 24 of the in-line unit 20. Pressure gauge 32 may be attached to the flow line 27 to monitor gas pressure to detect leaks.

A threaded cap (not shown) is screwed over the threaded fitting 24 at all times other than when the source of inert charging gas is coupled thereto, in order to prevent any possible escape of heating gas backwardly through the stem valve portion of the fitting 24.

Figure 7:
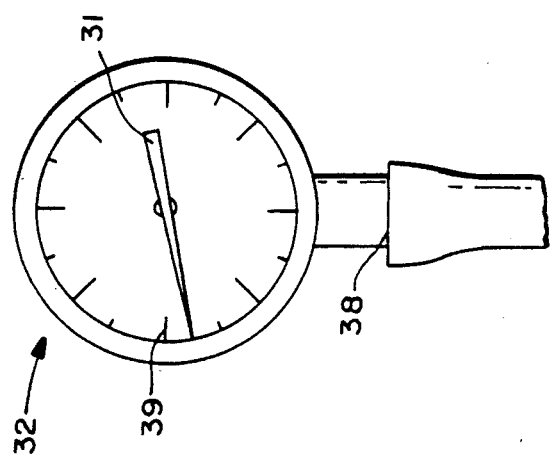
FIG. 7 is a front view in elevation of the detachable pressure gauge and fitting.

As seen best in FIGS. 2 and 4, the in-line unit 20 includes in fluid-flow-path communication three essential components: a heating gas bubble tight cutoff valve assembly 30, a pressure indicator coupling valve 33, and the threaded conventional tire stem valve fitting 24 for use with an external charging gas source. Pressure gauge 32 is conventional and attaches to housing 20 via a conventional quick coupler 38, or other suitable fast disconnect fittings, best seen in FIG. 2. Coupler 33 is the female portion of quick coupler 38. The male portion 40 of quick coupler 38 is attached to pressure gauge 32, as shown in FIG. 7. These elements are included within a base 34 made of cast or machined metal or a suitably strong and durable plastic material such as a polymer.

The base 34 includes internal structure defining a longitudinal flow path 35 extending therethrough from a threaded gas supply line inlet coupling 36 through the valve assembly 30 and to an outlet threaded coupling 37. When coupled to the housing 20, the pressure indicator 32 is in fluid communication with the longitudinal flow path 35 and measures the pressure therein. The stem valve fitting 24 also is in direct fluid flow communication with the flow path 35 and may be used to charge the flow path with the external gas source to detect leaks.

The in-line unit 20 may be permanently attached to the gas supply line downstream of the meter 16 and earthquake cutoff valve assembly 18 (when present) by use of conventional pipe fittings (not shown).

Figure 5:
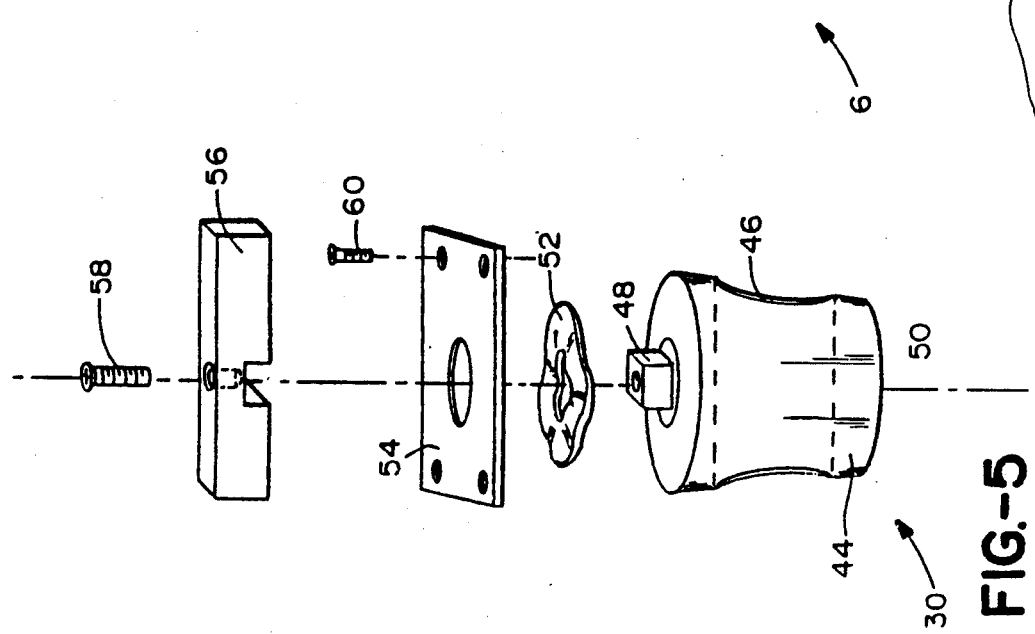
FIG. 5 is an exploded isometric view in elevation of components forming a charging gas cutoff valve within the in-line unit illustrated in FIG. 2.

As best seen in FIG. 5, the valve assembly 30 includes a frustoconical valve body 44 defining a transverse opening 46 therethrough. The valve assembly 30 may alternatively be made in other configurations such as the ball variety. The valve body 44 may be machined from cast bronze or from brass bar stock so as to fit snugly within a tapered complementary well 46 formed within the base 34. An integrally formed handle protrusion 48 extends from the top of the valve body symmetrically about an axis of rotation (and explosion) 50.

A loading washer, such as a wavey washer 52 is seated over the protrusion 48 between the top of the valve body 44 and a cover plate 54. A bar handle 56 engages with the protrusion 48 in a locking arrangement, and is held in place by a central screw 58. Finally, four screws 60 (only one of which is shown in FIG. 5) lock the plate 54 (and body 44, washer 52 and handle 56) to the base 34. Two raised detents 62 limit the angular displacement of the handle 56 (and valve body 44) to ninety degrees, i.e. between a fully closed position as shown in FIG. 4 and a fully open position.

The pressure indicator 32 may be of any suitable type. Its function is to monitor pressure in the gas distribution system to the residence following the cutoff of the main gas supply. The pressure indicator 32 monitors the pressure using either the gas remaining in a pressurized line or the charging gas from an external source. A gauge having a moving indicator needle 31 and the fixed scale 39 is shown as the presently preferred implementation of the pressure indicator 32 in FIG. 7. The indicator 32 may be calibrated in any suitable unit of measure such as inches of water or mercury, or pounds per square inch. The pressure measuring capability of the gauge 32 is dependent upon the size of the gas distribution system downstream of the main cutoff valve 12. For a typical residence, a maximum pressure indication of 14 inches of water or one half pound per square inch is quite adequate. Pressure gauge 32 may be either attached to housing 20 via valve 33, or attached to the external charging gas tank 26, shown in FIG. 6.

The components and materials of which the indicator 32 is constructed should not be reactive with any of the elements or compounds included within natural or LPG energy gases typically supplied to residential gas utility customers. The scale 39 may be provided with a "normal" pressure range as well as pressure limits.

To use the gas leak detector immediately after a seismic disturbance, the heating gas supply should be closed off from the distribution system, either because the earthquake valve assembly 18 is now closed, or the main cutoff valve 12 is closed. Valve 30 may also be used to close off the gas supply from the distribution system. With the heating gas supply effectively cutoff from the premises served thereby, the gas leak detector is then available for use.

First, the heating gas cutoff valve 30 is rotated from its normally open (in-line) position to its cutoff (transverse) position When an external charging gas is desired, the threaded cap over the stem valve fitting 24 is then removed and a suitable source of inert charging gas, such as the air pump 22, is then coupled to the stem valve fitting 24. Pressure gauge 32 is then coupled to in-line unit 20 via coupler 33. Charging gas is then introduced, e.g. via the pump 22 or canister 26, into the gas supply lines downstream of the now closed cutoff valve 30 until a predetermined nominal pressure, such as 10 inches of water (residential home) or 5 pounds per square inch (industrial factory or warehouse) is established. The source of inert charging gas is then disconnected from the fitting 24.

Then, a predetermined period of time, such as five minutes for residences and twenty minutes for industrial premises, is permitted to elapse. If there are any leaks in the system, even if minute, there will be a noticeable drop in pressure indicated at the pressure indicator, and steps may then be taken to locate the leak and stop it. When a leak condition is detected by the presence of a noticeable drop in pressure within the preestablished waiting time period, the source of the leak is then located and fixed, and then the test procedure employing the present gas leak detector is repeated, until all leaks are located and stopped.

If, after the predetermined test interval has elapsed, there has been no diminution of pressure as indicated at the pressure indicator 32, there are no further leaks present in the gas distribution system, and it should be safe to restore gas service by opening the valve 12 and/or resetting the seismic valve 18. Gas pressure gauge 32 may then be removed from the in-line unit 20.

However, before the valves 12 or 18 are opened, the heating gas supply cutoff valve 30 in the housing 34 is opened by rotation of the handle 56 to the in-line position. Then, the valves 12/18 are opened or reset as the case may be, and energy gas is permitted to flow into the distribution lines at the residence. Any gas pilots may then be relit in accordance with the instructions accompanying the particular appliance. Finally, all heating gas supplied appliances should be checked for proper operation. The cap should be secured over the fittings 24 and 33. The leak detection procedure is now completed.

The above procedure, using the external charging gas, is also particularly useful in checking new construction lines and/or non-pressurized lines for leaks.

To those skilled in the art to which this invention pertains, many widely differing embodiments and arrangements will be suggested upon consideration of the foregoing description of a preferred embodiment. The description is by way of illustration only, and should not be considered to be limiting of the present invention, the scope of which is more particularly set forth in the following claims.

I claim:

1. A permanent in-line gas leakage detector comprising: a housing having coupling means for enabling the housing to be installed in a gas supply line downstream of a main gas shutoff valve, the coupling means disposed on opposed ends of the housing, the housing having interior structure defining a flow path through the housing, valve means within the housing for cutting off the downstream gas supply line from the source of gas, the valve means having a valve seat with a flow through opening, the valve seat surrounding a valve body with a transverse opening therethrough, a pressure indicator coupling means within the housing and communicating with the flow path, a gas pressure indicator, and an external gas source connecting means for enabling a two way flow of an optional charging gas from a source thereof to enter the housing and pass into the downstream gas supply line.

2. The gas leakage detector set forth in claim 1 wherein the optional charging gas source comprises a small disposable pressure vessel canister fitted with a removable flow control valve containing a fitting adapted for mating with the charging gas source connecting means of the housing and a fitting for attaching the gas pressure indicator to monitor gas pressure.

3. The gas leakage detector set forth in claim 1 wherein the charging gas source comprises a small air pump having a hose attachable to the charging gas source connecting means of the housing.

4. The gas leakage detector set forth in claim 1 wherein the pressure indicator coupling means is a valve orifice for connecting the gas pressure indicator to the housing.

5. The gas leakage detector set forth in claim 1 wherein the gas pressure indicator includes a pressure gauge having a moving indicator needle and a fixed scale.

6. The gas leakage detector set forth in claim 1 wherein the charging gas source connecting means comprises a two way flow valve assembly and a fitting for optionally attaching the gas pressure indicator.

7. The gas leakage detector set forth in claim 1 installed in the gas supply line downstream of shock activated automatic shutoff valve means.

8. A gas leakage detector, comprising: a rectangular housing having threaded pipe fittings at opposed ends thereof enabling the housing to be coupled in-line with the gas supply line, the housing including interior structure defining a flow path through the housing and a passage, the passage leading, to a gas pressure indicator coupling means and an optional charging gas source connecting means, a gas pressure indicator for optional attachment to the gas pressure indicator coupling means, a gas supply cutoff valve seat extending through the flow path, the valve seat holding a generally frustoconical valve body having an exterior geometry to fit snugly within the valve seat and further having a transverse opening therethrough, spring means for biasing the valve body against the valve seat, and a handle means enabling the valve to be operated by a user.

9. A method for detecting gas leaks within a gas distribution system comprising the steps of:
closing a valve within a gas leak detector housing permanently coupled in-line with the gas distribution system in order to cutoff the gas supply downstream of the valve,
monitoring the existing gas pressure within the distribution system downstream from the valve with a detachable pressure gauge coupled to the housing in order to determine whether there is any diminishment in pressure, thereby indicating the presence of one or more gas leaks within the distribution system, and
thereupon opening the valve to restore flow of gas from the source thereof.

10. The method in claim 9 with the additional steps of introducing a charging gas from a source thereof via a two way flow valve charging gas fitting within the gas detector housing into the system downstream of the valve following the closing of the valve, and monitoring charging gas pressure within the system with the pressure gauge in order to determine when a predetermined, desired charging gas pressure is reached and whether thereafter there is any diminishment in pressure.

11. The method in claim 10 wherein the pressure gauge is attached to the charging gas source via a fitting therein.

* * * * *